United States Patent
Kavalam et al.

(10) Patent No.: US 7,665,098 B2
(45) Date of Patent: Feb. 16, 2010

(54) SYSTEM AND METHOD FOR MONITORING INTERACTIONS BETWEEN APPLICATION PROGRAMS AND DATA STORES

(75) Inventors: Jude Jacob Kavalam, Seattle, WA (US); Adam D. Stritzel, Redmond, WA (US); Nigel S. Keam, Redmond, WA (US); Timothy D. Noonan, Cary, NC (US); Valeriy V. Tsuryk, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 867 days.

(21) Appl. No.: 11/117,869

(22) Filed: Apr. 29, 2005

(65) Prior Publication Data

US 2006/0248310 A1 Nov. 2, 2006

(51) Int. Cl.
*G06F 9/44* (2006.01)
*H04L 29/06* (2006.01)
*G06F 17/30* (2006.01)

(52) U.S. Cl. .............. 719/328; 713/164; 707/3

(58) Field of Classification Search .......... 707/1–10; 709/201–207, 217–219; 719/318, 328; 714/47; 713/164

See application file for complete search history.

(56) References Cited

U.S. PATENT DOCUMENTS

| | | |
|---|---|---|
| 5,311,591 A | 5/1994 | Fischer |
| 5,560,005 A | 9/1996 | Hoover et al. |
| 5,915,085 A | 6/1999 | Koved |
| 6,308,274 B1 | 10/2001 | Swift |
| 6,338,079 B1 | 1/2002 | Kanamori et al. |
| 6,351,811 B1 | 2/2002 | Groshon et al. |
| 6,587,888 B1 | 7/2003 | Chieu et al. |
| 6,728,884 B1 | 4/2004 | Lim |

(Continued)

FOREIGN PATENT DOCUMENTS

EP 0813132 A2 12/1997

(Continued)

OTHER PUBLICATIONS

Author Unknown, Impersonation, Documentation of Windows 2000, http://www.microsoft.com/technet/prodtechnol/windows2000serv/reskit/distrib/dsce_ctl_awdg.mspx?pf=true, printed Jan. 26, 2007, 5 pages, Microsoft Corporation, USA.

(Continued)

*Primary Examiner*—Hyung S Sough
*Assistant Examiner*—Charles E Anya
(74) *Attorney, Agent, or Firm*—Senniger Powers LLP (57) ABSTRACT

Monitoring interactions between application programs and data stores for analyzing stability of application programs. A method of the invention intercepts interactions from a plurality of application programs to a data store. The method also identifies pre-execution data relating to each of the intercepted interactions and the intercepted interaction is executed. The method identifies post-execution data relating to each of the executed interactions. The identified pre-execution data and the identified post-execution data from each of the interactions are normalized to create normalized interaction data for each of the interactions. The method combines the normalized interaction data for each of the interactions as a function of the application programs associated with each of the interactions. The method further stores the combined interaction data for analysis of the interactions between the application programs and the data store which is indicative of the stability of the application programs.

18 Claims, 7 Drawing Sheets

U.S. PATENT DOCUMENTS

| | | | |
|---|---|---|---|
| 6,970,924 B1* | 11/2005 | Chu et al. | 709/224 |
| 6,973,577 B1* | 12/2005 | Kouznetsov | 726/25 |
| 7,290,266 B2* | 10/2007 | Gladstone et al. | 719/318 |
| 7,448,084 B1* | 11/2008 | Apap et al. | 726/24 |
| 2002/0083183 A1* | 6/2002 | Pujare et al. | 709/231 |
| 2002/0087665 A1 | 7/2002 | Marshall et al. | |
| 2002/0099952 A1 | 7/2002 | Lambert et al. | |
| 2003/0004952 A1 | 1/2003 | Nixon et al. | |
| 2003/0023774 A1 | 1/2003 | Gladstone et al. | |
| 2003/0084291 A1 | 5/2003 | Yamamoto et al. | |
| 2003/0084296 A1 | 5/2003 | Kyojima et al. | |
| 2003/0110253 A1* | 6/2003 | Anuszczyk et al. | 709/224 |
| 2003/0204730 A1 | 10/2003 | Barmettler et al. | |
| 2003/0225897 A1 | 12/2003 | Krawetz | |
| 2004/0054926 A1 | 3/2004 | Ocepek et al. | |
| 2004/0128505 A1 | 7/2004 | Larsen | |
| 2004/0220976 A1 | 11/2004 | Anathanarayanan et al. | |
| 2005/0033777 A1* | 2/2005 | Moraes et al. | 707/202 |
| 2005/0091658 A1 | 4/2005 | Kavalam et al. | |
| 2005/0228998 A1 | 10/2005 | Chan et al. | |
| 2006/0031122 A1* | 2/2006 | Lane et al. | 705/16 |
| 2007/0107052 A1* | 5/2007 | Cangini et al. | 726/22 |
| 2007/0198709 A1 | 8/2007 | Hawkinson et al. | |
| 2007/0198724 A1 | 8/2007 | Hawkinson et al. | |

FOREIGN PATENT DOCUMENTS

| | | | |
|---|---|---|---|
| WO | 0192981 A2 | 12/2001 | |

OTHER PUBLICATIONS

Langa, Fred, "The Langa List," available at http://www.langa.com/newsletters/2002/2002-06-03.htm, Jun. 3, 2002.

Spengler, Brad, "GRSecurity ACL Documentation," available at http://www.grsecurity.net/gracldoc.pdf, Apr. 1, 2003, 40 pages.

Kavalam, "Windows 'Longhorn': Enhancements for a Trustworthy Application Experience", Microsoft Professional Developers Conference 2003 Architecture Symposium, Oct. 2003, 23 pages, http://download.microsoft.com/download/6/6/9/669C56E3-12AF-48C5-AB2A-E7705F1BE37F/CLI312.ppt, Microsoft Corporation, U.S.A.

Unknown, "The Windows Installer Service Overview," URL: http://www.microsoft.com/technet/prodtechnol/ Windows2000Pro/evaluate/featfunc/wispro.mspx?pf=true., Microsoft Corporation, 1999, USA.

* cited by examiner

| CALLER | FILE | ACTION | NORMALIZED INTERACTION DATA |
|---|---|---|---|
| glc133.tmp | Test.dll | C W | <PROGRAM_FILES>\Prog\images\~GLH0005.TMP |
| glc345.tmp | Test.dll | R | <PROGRAM_FILES>\Prog\images\~GLH0025.TMP |
| ... | ... | ... | ... |

| CALLER | REGISTRY | ACTION | NORMALIZED INTERACTION DATA |
|---|---|---|---|
| Test.dll | advapi.dll | R | HKEY_CURRENT_USER\Software\Versions\Folders |
| Test.dll | serchapi.dll | W | HKEY_CURRENT_USER\Software\Versions\Search |
| ... | ... | ... | ... |

328 → (CALLER column)
330 → (REGISTRY column)

FIG. 4

SYSTEM AND METHOD FOR MONITORING INTERACTIONS BETWEEN APPLICATION PROGRAMS AND DATA STORES

TECHNICAL FIELD

Embodiments of the present invention generally relate to the field of monitoring interactions between applications. In particular, embodiments of this invention relate to monitoring the transient and persistent state of data stored in a file system, registry configuration store, or other memory accessed via application programming interface (API) calls between applications or processes and the stored data.

BACKGROUND OF THE INVENTION

In a typical computing system or device, one or more application programs, software, or other computer-executable instructions are installed in addition to an operating system to enhance a user's experience with the computing system or device. For example, a user may install a word processing application program to prepare a report and may print the report to a printer connected to the computing system. Another user may install a media processing and managing application software to manage her pictures stored in a digital camera.

The application programs interact with the operating system and/or stored data via a set of routines used by the application program. These routines, also known as an application programming interface (API), direct the performance of some procedures by the operating system. In the word processing application program above, when the user runs the word processing application program, the word processor may initiate a number of API calls to the operating system and its associated components such that the word processor may display a date on the report or may save the location of the report in the computing system in a "Most Used Files" folder/directory. Such API calls may involve reading, writing, creating, or removing one or more files relating to the operating system or in the data store. In addition, some API calls may modify entries in a configuration database associated with the operating system.

While the interactions between application programs and the operating system are designed to enhance the user's experience and perform desired functions, unintended consequences of the interactions may cause application programs or the operating system to operate correctly. For example, a first application program may wish relocate a file from folder B to folder A while a second application program may wish to access the same file in folder B. When the second application program could not find the file in folder B, the second application program may become unstable and hang or cease to continue to operate because the file is missing from folder B. This may further result in failure of the operating system.

Some current systems monitor interactions or memory accesses, such as API calls, between a signal application program and the operating system to prevent crashes or other unexpected consequences. These systems intercept the interactions and identify data relating to the interactions for a particular application program and computing system environment. However, the recorded data from such monitoring systems is limited to the particular application program and computing system environment that is monitored. The data recorded by existing systems is inefficient for making comparison with other systems. For example, suppose interactions between an application A are monitored in a computing system X and the same application A is also monitored in a computing system Y. Both computing systems X and Y execute the same application A, but the computing system X may have a different software and hardware configuration from that of the computing system Y. As such, the locations of the files or data that interact with the application A may be different in the computing system X and the computing system Y. The existing monitoring system would record system specific data (e.g., file path, process ID, or the like) relating to the interactions between the application A and files or data in the computing system X. Such system specific information is not useful when comparing with recorded data from the interaction with the computing system Y because the system specific information of the computing system X differs from the computing system Y.

Accordingly, a system and method for monitoring interactions between a plurality of application programs and stored data and combining the monitored interactions for analysis are desirable to address one or more of these and other disadvantages.

SUMMARY OF THE INVENTION

Embodiments of the present invention overcome the shortcomings of the existing systems by creating normalized interaction data from data relating to interactions between application programs and stored data or files. For example, embodiments of the present invention remove machine-specific information, system-specific information, and/or user-specific information from the data relating to the interactions. The normalized interaction data is combined as a function of the one or more application programs associated with the interaction. Further, embodiments of the present invention store the combined interaction data for analysis. Interactions between the application programs and the operating system and/or other stored data are indicative of the stability of the application programs. The combined, normalized interaction data provides efficient and beneficial comparison of interaction data across different users, machines, and computing system environments.

According to one aspect of the invention, a computerized method monitors the interactions of application programs with stored data. The computerized method intercepts application programming interface (API) calls from a plurality of application programs to a data store. The pre-execution data relating to each of the intercepted API calls is identified. The computerized method executes the intercepted API calls. The computerized method also identifies post-execution data relating to each of the executed API calls. The identified pre-execution data and the identified post-execution data from each of the API calls are normalized to create normalized interaction data for each of the API calls. The normalized interaction data for each of the API calls is combined as a function of the application programs associated with each of the API calls. The computerized method stores the combined interaction data for analysis of the interactions between the application programs and the data store.

According to another aspect of the invention, a system monitors process interaction with a memory area storing files and configuration data. The system includes a memory area storing a plurality of application programs, file data, configuration data, and aggregated interaction data. The system includes a means for intercepting an application programming interface (API) call from one of application programs to the file data or configuration data stored in the memory area. The system also includes a means for determining interaction data related to the intercepted API call and a means for normalizing the determined interaction data to create normalized interaction data. The system further includes a means for adding the normalized interaction data to the aggregated interaction data as a function of an application identifier associated with the one of the application programs. The aggregated interaction data is indicative of the stability of the plurality of application programs.

In accordance with a further aspect of the invention, one or more computer-readable media have computer-executable components that monitor the memory accesses of application programs with stored data for analysis. A tracer component intercepts memory accesses from a plurality of application programs to a memory area storing files and configuration data. A logger component identifies data relating to each of the memory accesses intercepted by the tracer component. A normalizer component normalizes the data identified by the logger component to create normalized interaction data for each of the intercepted memory accesses. An aggregator component merges, as a function of the application programs initiating the intercepted memory accesses associated with each of the memory accesses, the normalized interaction data created by the normalizing component for analysis of the interaction between the application programs and the memory area.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
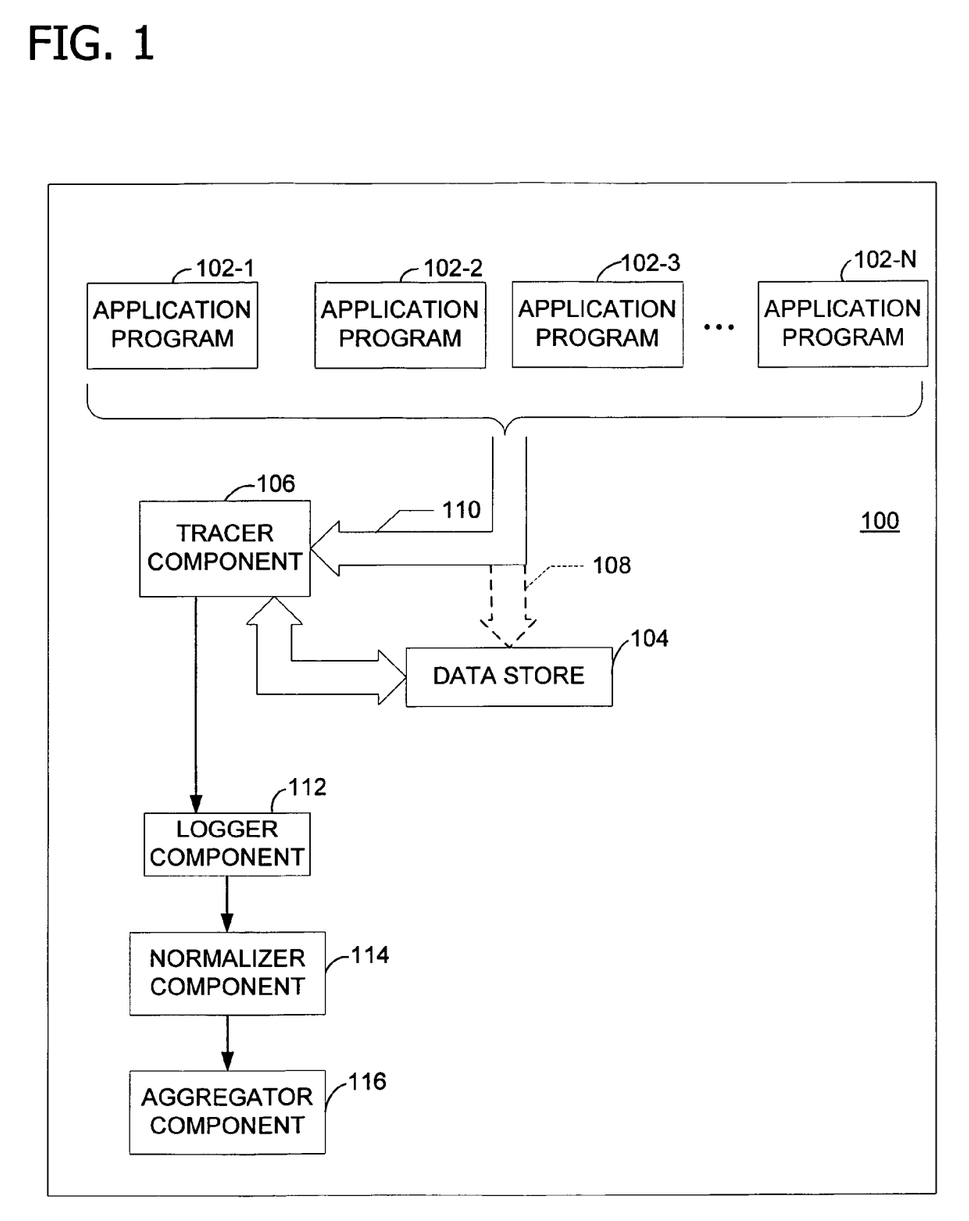
FIG. 1 is a diagram illustrating a system for monitoring interactions of application programs with stored data according to one embodiment of the invention.

Referring first to FIG. 1, a diagram illustrates a system 100 for monitoring interactions of application programs 102 with a data store 104 according to one embodiment of the invention. For example, the system 100 includes a computing device (not shown) such as the computer 130 in FIG. 5, a computer server, a collection of computing devices linked by a common communication network (such as an internet, an intranet, or the like), or other computing system that is capable of executing application programs 102, storing data in the data store 104, and permitting interactions between the application programs 102 and the data store 104.

The plurality of application programs 102 includes application software, a set of computer-executable instructions, programming codes, programming routines, or the like. For example, the application programs 102 may include a word processor program, a digital media (such as audio or video) player program, a finance organizing program (such as tax preparation), or the like. The data store 104 includes data such as files, configuration data, or a collection of data stored in storage areas such as a volatile memory, a non-volatile memory, or a combination thereof. In one embodiment, the data store 104 is part of a memory area which stores the application programs 102, file data, registry entries, registry keys, registry values, and/or aggregated interaction data (to be discussed below). In one embodiment, the stored data 104 includes files, configuration database entries, and monitored data. By reviewing interactions between the application programs 102 and the files or configuration database entries in the data store 104, a user may know the state of the file or configuration database or registry key/value both before and after the interaction and the user may examine the nature or the effect of the interaction.

As shown in FIG. 1, the application programs 102 uses system API calls to interact with the stored data 104. For example, the application program 102-1 interacts with the data store 104 by reading a file stored in the data store 104 (such as the read-only memory 138 or random access memory 140 of FIG. 5). In another example, the application program 102-2 accesses a memory area to modify another file stored in the data store 104. In another example, the application program 102-3 interacts with files or a configuration database of an operating system (such as the operating system 170 as described in FIG. 5) stored in the data store 104. From such interactions or memory accesses, application programs 102 may change, alter or modify data in the data store 104. Therefore, embodiments of the present invention advantageously monitor system APIs used for such interactions or memory accesses so as to better understand why the application programs 102 fail or why certain pieces of data in the data store 104 are missing or were modified.

The system 100 includes one or more computer-executable components for implementing aspects of the invention. In one embodiment, the system 100 includes a tracer component 106 for intercepting interactions between the application programs 102 and the data in the data store 104. The system 100 also includes a logger component 112 for identifying data relating to each of the interactions by the tracer component. A normalizer component 114 normalizes the data identified by the logger component 112 to create normalized interaction data for each of the intercepted interactions. After the normalizer component 114 creates the normalized interaction data, an aggregator component 116 combines or merges the normalized interaction data for each of the interactions as a function of the application programs associated with each of the interactions. In one embodiment, the tracer component 106 intercepts the API calls initiated from the application programs 102 to the data store 104. Instead of the direct interaction (shown by a dashed arrow 108) between the application programs 102 and the data store 104, the tracer component 106 intercepts or redirects (as shown by an arrow 110) the interactions (such as the API calls) from the application programs 102 to the data store 104 for further processing. For example, the tracer component 106 monitors activities of the application programs 102 and the data store 104. As soon as the tracer component 106 determines that there is an interaction between the application programs 102 and the data store 104, the tracer component 106 intercepts the interaction (such as the API call) for analysis. In one embodiment, the system 100 monitors the activities of the application programs 102 and the data store 104 and communicates with the tracer component 106 by notifying the tracer component 106 that there is an interaction between the application programs 102 and the data store 104.

The application programs 102 may not be aware that the tracer component 106 has intercepted the interactions as the tracer component 106 may be transparent to application programs 102 and/or data store 104. Aspects of the trace component are known in the art.

In one embodiment, the system 100 records a state of an execution environment of each of the application programs 102 before intercepting the interactions. For example, the system 100 identifies the following information relating to the state of execution environment of the application programs 102:

A. SESSION_INFO
  a. The name of the executable image for the process.
  b. The working directory of the process.
  c. The starting and ending time of the process (ending time is filled in later).
  d. Version information about the operating system.
B. ENVIRONMENT_BLOCK
  a. Each environment variable and its value (such as a machine identifier or an application program type identifier or an application program version identifier).
C. EXE_SIGNATURE
  a. Set of hashes to uniquely identify executable.
D. USER_SID
  a. The user security identification, such as a security identifier (SID), of the application program's or process' user.
E. DIRECTORIES
  a. The Directory path for storing operating system files.
  b. The Directory path for storing temporary files.
  c. The Directory path for storing user's documents.
  d. The Directory path for storing program files.
  f. The Directory path for storing menu items.
F. SHORT_DIRECTORIES
  a. Short-name versions of all the paths in the DIRECTORIES category.

The list above indicating the state of the execution environment of each of the application programs 102 is for illustration only and is not exhaustive. Other information relating to the state of the execution environment of the application programs may be identified.

Still referring to FIG. 1, the tracer component 106 communicates with a logger component 112 to identify and store pre-execution data such as execution environment parameters (e.g., the name of the application program 102-1, the type of the application program 102-1). After the tracer component 106 intercepts a particular interaction from the application programs 102 to the data store 104, the logger component 112 identifies information relating to the particular interaction such as the file in the data store 104 with which the application program 102-1 interacts.

In the embodiment where the tracer component 106 intercepts the API calls from the application programs 102 and the data store 104, the logger component 112 identifies one or more of the following for each of the API calls: an identifier for the API this data represents; the thread on which the API was called; the address of the caller of the API; a bit indicating whether the function failed; the value(s) of arguments passed in to the API, and the value(s) of arguments returned to the caller; and/or data provided by the interaction.

In another embodiment, the system 100 includes a means for intercepting an API call (such as the tracer component 106) from one of the application programs 102 to a file data or a configuration data stored in a memory area (such as the data store 104). In addition, the system 100 also includes a means for determining interaction data related to the intercepted API calls. Hardware and software such as a data structure, a user interface, an application program, an application software, computer-executable instructions or codes, firmware, and the like (such as illustrated in the figures) constitute means for normalizing the determined interaction data to create normalized interaction data, and means for adding the normalized interaction data to the aggregated interaction data as a function of an application identifier associated with said one of the application programs, wherein the aggregated interaction data is indicative of the stability of the plurality of application programs (to be described below).

In one example, the means for determining determines pre-execution data of each API call having "extensions", which include one or more of the following data in the following categories:

A. File:
  a. Gets the full-path for each file affected by an API.
  b. Notes whether the file exists (for pre- and post-execution comparison).
  c. Gets a checksum of the file (for pre- and post-execution comparison).
  d. Tracks handles to files (HANDLE and HFILE) so that target file details are known for APIs that take handles to files.
B. Configuration database entry (such as a registry key):
  a. Stores the name of the key.
  b. Notes whether the key exists (for pre- and post-execution comparison).
C. Configuration database entry value (such as a registry value):
  a. Stores the name of the value.
  b. Stores the type of the value.
  c. Stores the value itself (for pre- and post-execution comparison).

The logger component 112 identifies any of the exemplary pre-execution data illustrated above before the system 100, having a processor (such as the processing unit 132 in FIG. 5), executes the API call between the application programs 102 and the data store 104. After the execution of the API call, the logger component 112 identifies the post-execution data relating to each of the executed API calls. In another embodiment, the system 100 or the logger component 112 records a state of execution environment after the completion of the execution of the application programs 102.

Still referring to FIG. 1, at the completion of identifying the post-execution data, a normalizer component 114 normalizes the identified pre-execution data and the identified post-execution data to create normalized interaction data of each of the API calls or interactions. For example, the normalizer component 114 removes all or any machine-specific information, device-specific information, user-specific information or other system specific information from the identified pre- and post-execution data. As an illustration, if the pre-execution data includes an application path at: C:\Systems\test.exe, the normalizer component 114 removes the specific path (i.e., C:\Systems\) and replaces with a generic term, such as SYSTEM_FOLDER. By normalizing, embodiments of the present invention advantageously overcome deficiencies of prior systems by organizing the pre- and post-execution data in a uniform format. Because embodiments of the invention normalize the interaction data, the normalized interaction data is valuable for combining data from other systems to analyze the stability or behavior of the application programs.

As different systems have various ways of expressing a path to a file or configuration data entries, the normalizer component 114 rewrites those paths into a new and comparable path. In one example, normalizer component 114 normalizes the pre- and post-execution data relating to each of the interactions (such as the API calls) using the following three exemplary types of normalizing operations. Table 1 illustrates a generic normalization operation for normalizing data specifying a machine (such as the system 100) or a user.

TABLE 1

Generic normalization operation.

| Input String Fragment | Output String Fragment |
|---|---|
| The machine name. | <MACHINE_NAME> |
| The machine's domain. | <MACHINE_DOMAIN> |
| The user's name. | <USER_NAME> |
| The user's SID. | <USER_SID> |

Tables 2-3 illustrate normalization operations for normalizing data stored as files in the data store 104. For example, files customarily are stored in the data store 104 with a particular path identifying where the file is located. For example, as illustrated earlier, the file test.exe is stored at the following location: "C:\Systems\". Other files may be stored at different locations. For example, in an embodiment where the application programs 102 is stored in one execution environment while the data store 104 is in another execution environment, the path may include the following format: "\\DOMAIN\share\". As such, the normalizer component 114 removes the machine- or system-specific information from the pre- and post-execution data and rewrites the normalized interaction data in a generic format.

TABLE 2

File normalization examples.

| Input String Fragment | Output String Fragment |
|---|---|
| \\?\UNC\{THIS_MACHINE_NAME}\X$ | x: |
| \\{THIS_MACHINE_NAME}\X$ | x: |
| \\?\X:\ | x:\ |
| \\?\UNC\{SOME_OTHER_MACHINE} | \\{SOME_OTHER_MACHINE} |

TABLE 3

Additional file normalization examples.

| Input String Fragment | Output String Fragment |
|---|---|
| The folder storing documents. | <DOCUMENTS> |
| The folder storing program files. | <PROGRAM_FILES> |
| The folder storing menu items. | <START_MENU> |
| The folder storing system files. | <SYSTEM_DIR> |
| The folder storing temporary files. | <TEMP_DIR> |
| The folder storing user profile data. | <USER_PROFILE> |
| The folder storing profile data for all users. | <ALL_USERS_PROFILE> |
| The folder storing application data. | <APP_DATA> |

Table 4 illustrates examples of normalized files according to the normalizing operations described above.

TABLE 4

File path normalization operation examples.

| Original Path | Normalized Path |
|---|---|
| c:\system\test.dll | <SYSTEM_DIR>\test.dll |
| d:\system\test.dll | <SYSTEM_DIR>\test.dll |
| c:\Documents\USER_A\test.exe | <USER_PROFILE>\test.exe |
| \\DOMAIN\Share\USER_B\test.exe | <USER_PROFILE>\test.exe |

In a further example, the normalizer component 114 normalizes configuration database entries, such as registry entries and/or registry entry values. Table 5 illustrates an exemplary normalization operation for normalizing configuration database entries, and table 6 shows examples of configuration database entries in the pre-normalized format and the post-normalized format. While Tables 5 and 6 are specific to an implementation of the invention having a registry, the invention is operable with implementations of the invention having any configuration data base or other configuration data stores.

TABLE 5

Configuration database normalization operation examples.

| Input String Fragment | Output String Fragment |
|---|---|
| \Registry\Machine | HKEY_LOCAL_MACHINE |
| \Registry\Machine\Software\Classes | HKEY_CLASSES_ROOT |
| \Registry\User | HEKY_USERS |
| \Registry\Machine\System\CurrentControlSet\Hardware Profiles\Current | HKEY_CURRENT_CONFIG |
| \Registry\User\{User's SID} | HKEY_CURRENT_USER |
| \Registry\User\{User's SID}\Software\Classes | HKEY_CLASSES_ROOT |

TABLE 6

Additional configuration database normalization operation examples.

| Original Path | Normalized Path |
|---|---|
| \Registry\User\Software\Classes\.test | HKEY_CLASSES_ROOT\.test |
| \Registry\Machine\Software\Classes\.test | HEKY_CLASSES_ROOT\.test |

Other normalization operations may be employed by the normalizer component 114 without departing from the scope of the invention.

Figure 2A:
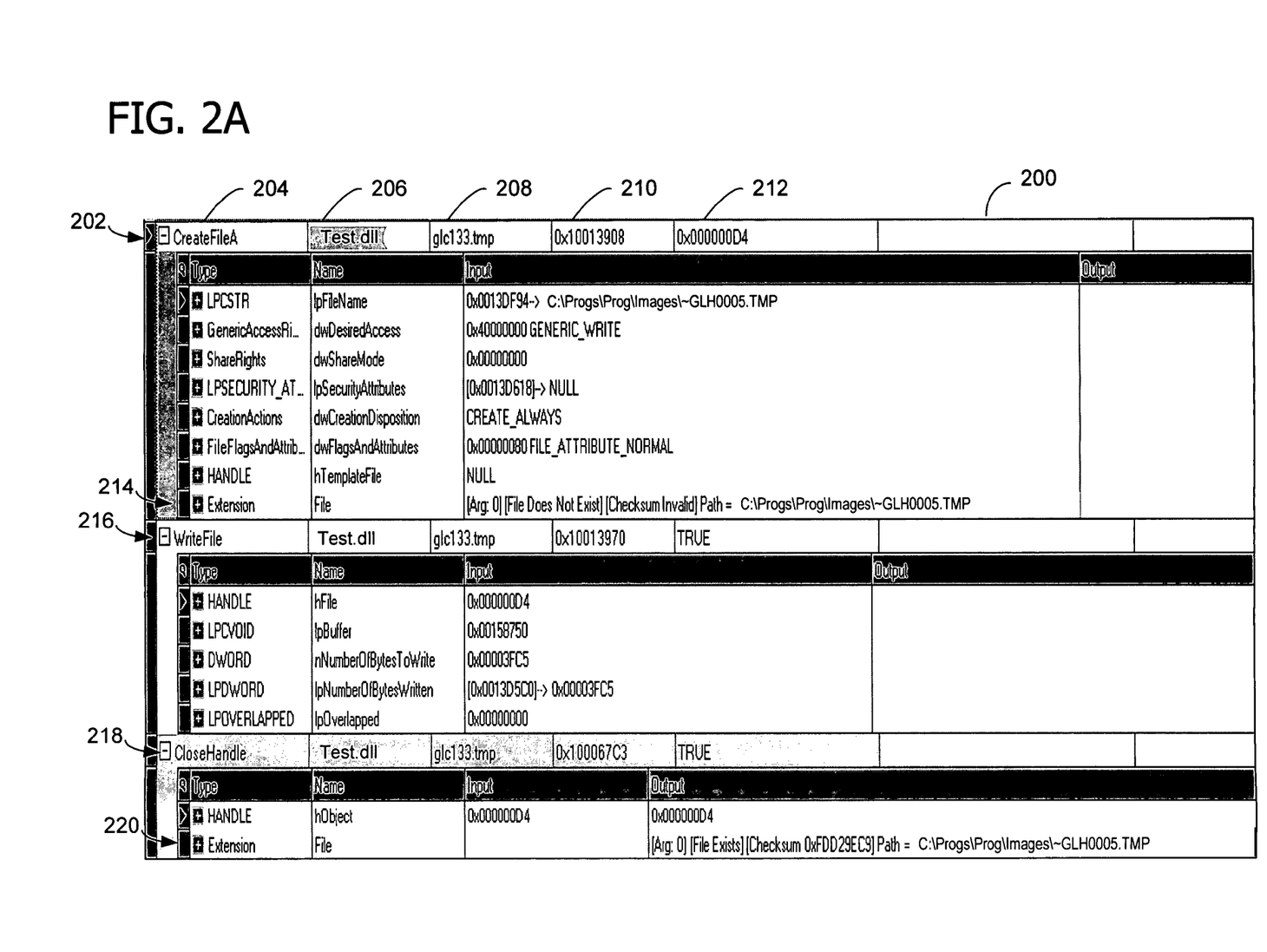
FIG. 2A is a screenshot illustrating identified pre-execution data and identified post-execution data relating to an interaction of an exemplary application program and a file according to one embodiment of the invention.

As a further illustration, FIG. 2A shows an exemplary screenshot 200 illustrating identified pre-execution data and identified post-execution data relating to an interaction of an exemplary application program and a file according to one embodiment of the invention. The screenshot 200 includes sections 202, 216, and 218 as an illustration of the execution of the API call or the interaction between an application program and a file in the data store 104. The screenshot 200 also includes column headings 204, 206, 208, 210, and 212. The heading 204 describes an action to be performed or executed in the interaction (such as the API call). The heading 206 describes a name of the executable data or file in which the API is located. The heading 208 describes a name of the application program or file that calls the API or initiates the interaction. The heading 210 describes a return address and the heading 212 describes a return value. In the example shown in FIG. 2, an application program "glc133.tmp" calls the API or initiates the interaction with "Test.dll". The action to be performed in the section 202 is "CreateFileA" with a return address (i.e., memory address) of "0x10013908" and a return value of "0x000000D4".

As shown in FIG. 2, the execution of the interaction includes three actions: "CreateFileA", "WriteFile", and "CloseHandle". The section 202 describes the "CreateFileA" action. In particular, at row 214, the application program "glc133.tmp" wishes to create a new file "GLHO005.TMP" in a location of "C:\Progs\Prog\Images\". It also indicates that there was no such file "GLH0005.TMP" at that location, according to the pre-execution data identified by the logger component 112. In the next section 216, the application program "glc133.tmp" writes to the newly created file "GLH0005.TMP" and in the section 218 at row 220, the application program "glc133.tmp" has completed its interaction (such as the API call) and the file "GLH0005.TMP" is stored in the data store 104 at such location: "C:\Progs\Prog\Images\".

By monitoring the interactions between the application programs 102 and the data store 104, embodiments of the present invention intercept the interactions and identify pre- and post-execution data relating to the interactions. In addition, embodiments of the invention normalize the identified data by creating normalized interaction data as a function of the application programs associated with the interactions, which is illustrated in FIG. 2B.

Figure 2B:
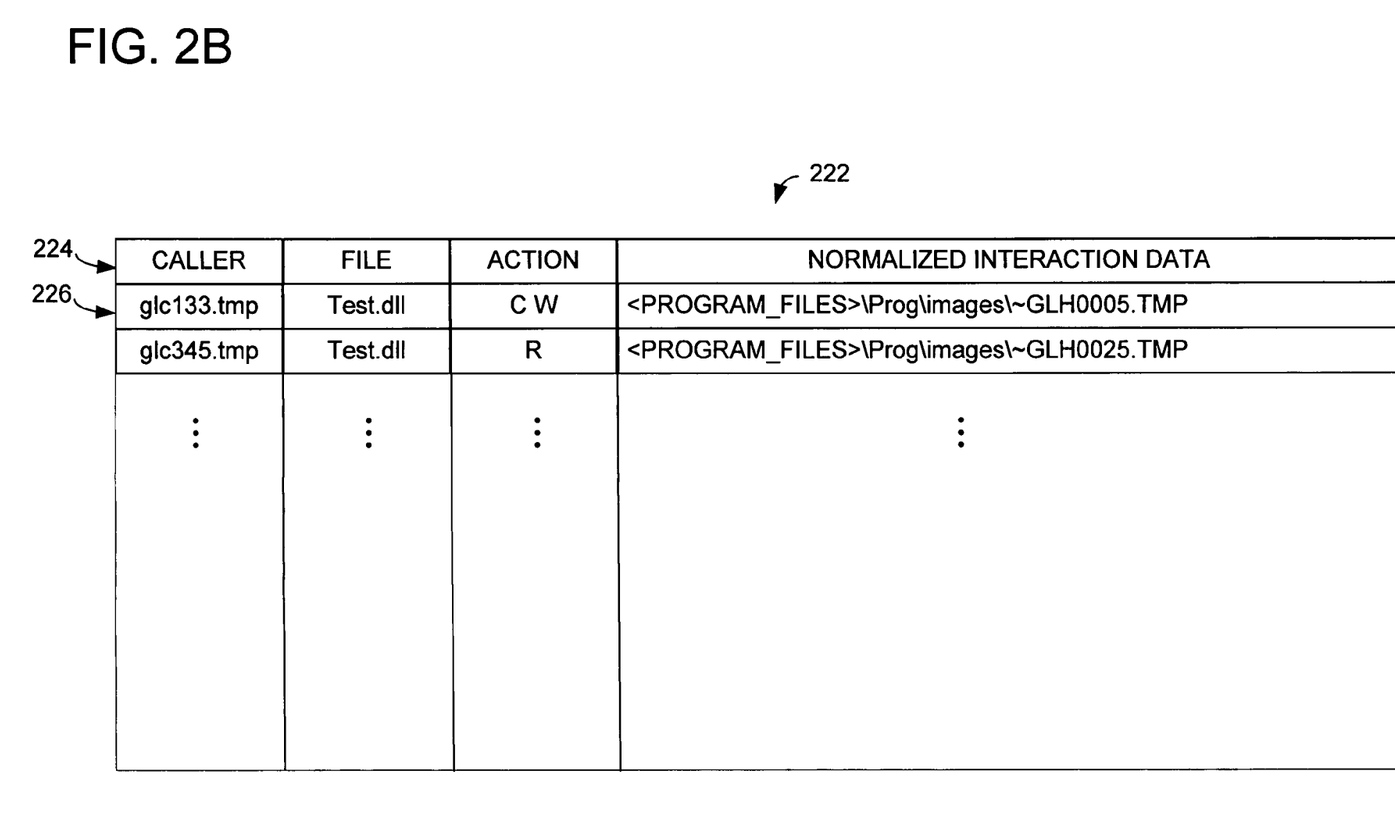
FIG. 2B is a diagram illustrating exemplary normalized interaction data of the application program of FIG. 2A according to one embodiment of the invention.

FIG. 2B is a diagram 222 illustrating exemplary normalized interaction data of the application program of FIG. 2A according to one embodiment of the invention. For example, as shown in row 224, the diagram includes data relating to the name of the application program that calls or initiates the interactions; the file or data with which the application program interacts; the action involved in the interaction and the normalized interaction data relating to the interaction. Using the example from FIG. 2A, row 226 shows the normalized interaction data "<PROGRAM_FILES>\Prog\Images\~GLH0005.TMP" instead of "C:\Progs\Prog\Images\GLH0005.TMP", as identified in the post-execution data. The normalizer component 114 removes the machine-specific path "C\Progs\" because other systems or machines may not have similar path for storing the file "GLH0005.TMP" in the data store 104.

Figure 3A:
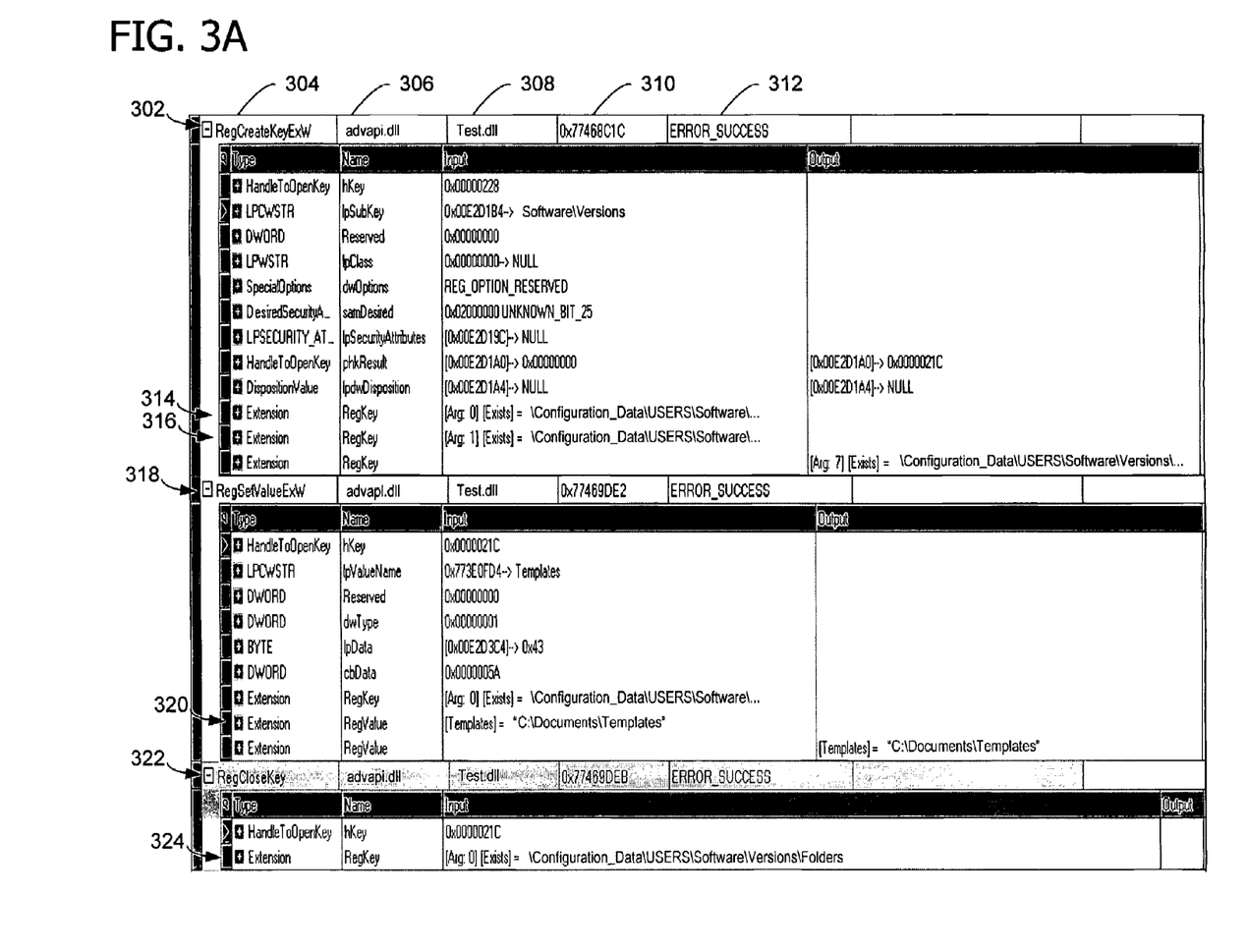
FIG. 3A is a screenshot illustrating identified pre-execution data and identified post-execution data relating to an interaction of an exemplary application program and a configuration database entry according to one embodiment of the invention.

In another embodiment, application programs 102 interact with configuration database entries such as registry entries. The invention is not limited to implementations having a registry. The invention is operable with any implementation storing configuration data. FIG. 3A shows an exemplary screenshot 300 illustrating identified pre-execution data and identified post-execution data relating to an interaction of an exemplary application program and a configuration database entry according to one embodiment of the invention. The screenshot 300 illustrates that the value of the configuration database entry is modified. Similar to the screenshot 200 in FIG. 2, screenshot 300 includes sections 302, 318, and 322 as an illustration of the execution of the API call or other interaction between the application program and the configuration database entry. The screenshot 300 also includes column headings 304, 306, 308, 310, and 312. The heading 304 describes an action to be performed or executed in the interaction (such as the API call). The heading 306 describes a name of the configuration database entry in which the API is located. The heading 308 describes a name of the application program or file that calls the API or initiates the interaction. The heading 310 describes a return address and the heading 312 describes a return value. In the example shown in FIG. 3A, an application program "Test.dll" calls the API or initiates the interaction with "advapi.dll". The action to be performed in the section 302 is "RegCreateKeyExW" with a return address (i.e., memory address) of "0x77468C1C" and a return value of "ERROR_SUCCESS".

As shown in FIG. 3A, the execution of the interaction includes three actions: "RegCreateKeyExW" (i.e., create a registry key), "RegSetValueExW" (i.e., set a registry key value), and "RegCloseKey" (i.e., close registry key). The section 302 describes the "RegCreateKeyExW" action. In particular, at row 314, the application program "Test.dll" wishes to create a registry entry of "\Configuration_Data\USER\Software\Versions\Folders". However, in row 316, it indicates that such registry entry already exists. Consequently, in section 318, at row 320, the value "C:\Documents\Templates\" is set for the registry entry identified above. As such, at section 322, the application program "Test.dll" closes the identified registry entry. The application program "Test.dll" modifies the registry entry in the interaction (such as the API call).

Figure 3B:
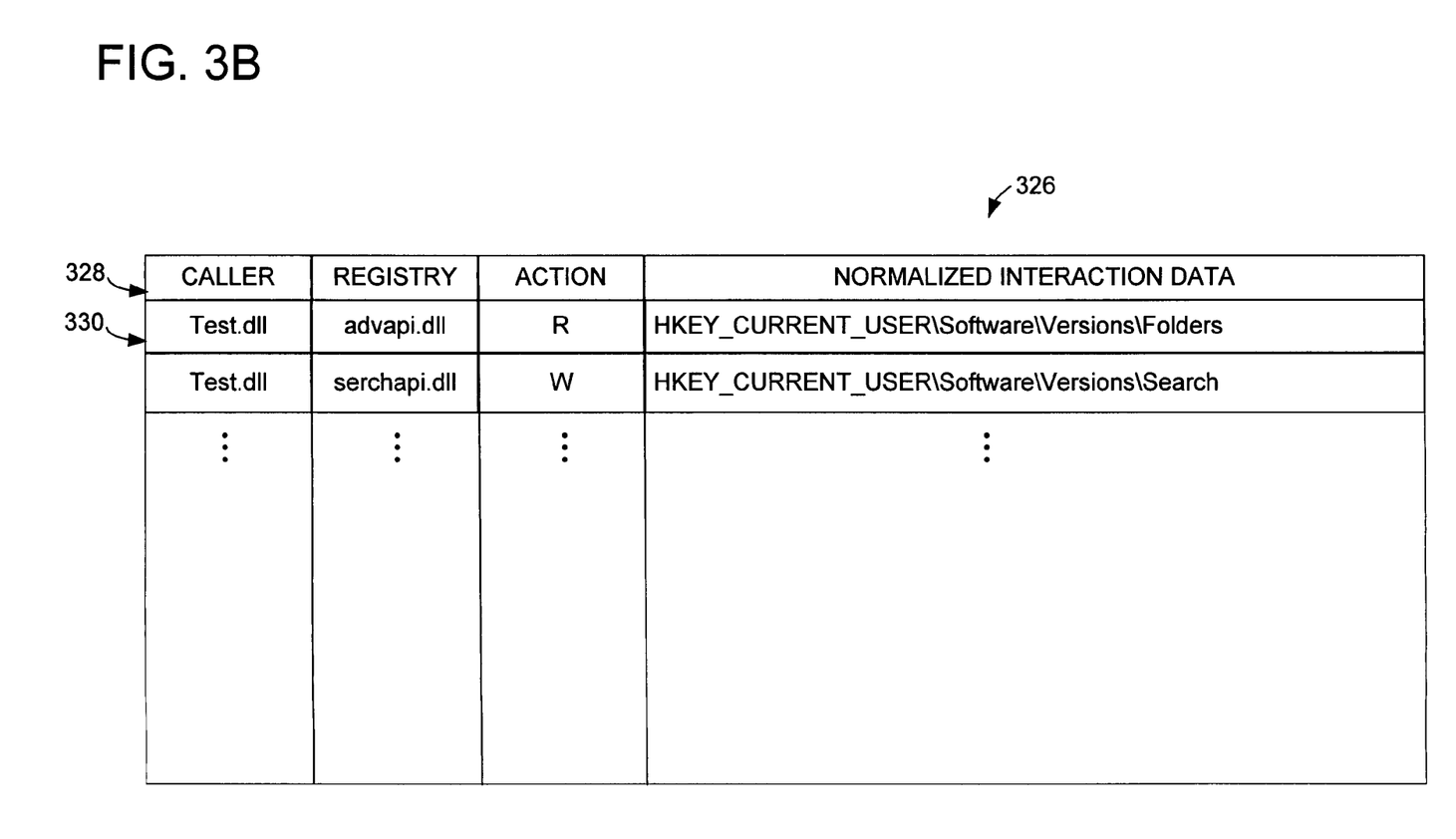
FIG. 3B is a diagram illustrating exemplary normalized interaction data of the application program of FIG. 3A according to one embodiment of the invention.

FIG. 3B illustrates a diagram 326 illustrating an exemplary normalized interaction data of the application program of FIG. 3A according to one embodiment of the invention. For example, as shown in row 328, the diagram includes data relating to the name of the application program that calls or initiates the interactions; the configuration database entry with which the application program interacts; the action involved in the interaction and the normalized interaction data relating to the interaction. Using the example from FIG. 3A, row 330 shows the normalized interaction data "HKEY_CURRENT_USER\Software\Versions\Folders" instead of "\Configuration_Data\USER\Software\Versions\Folders", as identified in the post-execution data in FIG. 3A. The normalizer component 114 removes the machine-specific path "\Configuration_Data\USER" because other systems or machines may not have similar path for the configuration data entry in the data store 104.

Returning to FIG. 1, after the normalizer component 114 creates the normalized interaction data, an aggregator component 116 combines or merges the normalized interaction data for each of the interactions (such as the API calls) as a function of the application programs associated with each of the interactions. The aggregator component 116 adds the normalized interaction data to an aggregated normalized data such that the aggregated interaction data includes all interactions from different systems, without the machine-, user-, or system-specific information for analysis. For example, the combined or aggregated interaction data may be stored in the data store 104 for analyzing the stability of the application programs 102. Because the application programs 102 and the stored data 104 may be installed and/or stored in different execution environment, machines, systems, computing devices, or the like, the combined or aggregated interaction data is useful in allowing a user to perform a query such as "Which files or configuration database entries does application program P access?" The user may retrieve a portion of the combined interaction data and the result of such query from the combined interaction data is beneficial to programmers, software engineers, or the like to review and evaluate the stability of the application programs 102 and/or the files or the configuration database entries in the data store 104.

Figure 4:
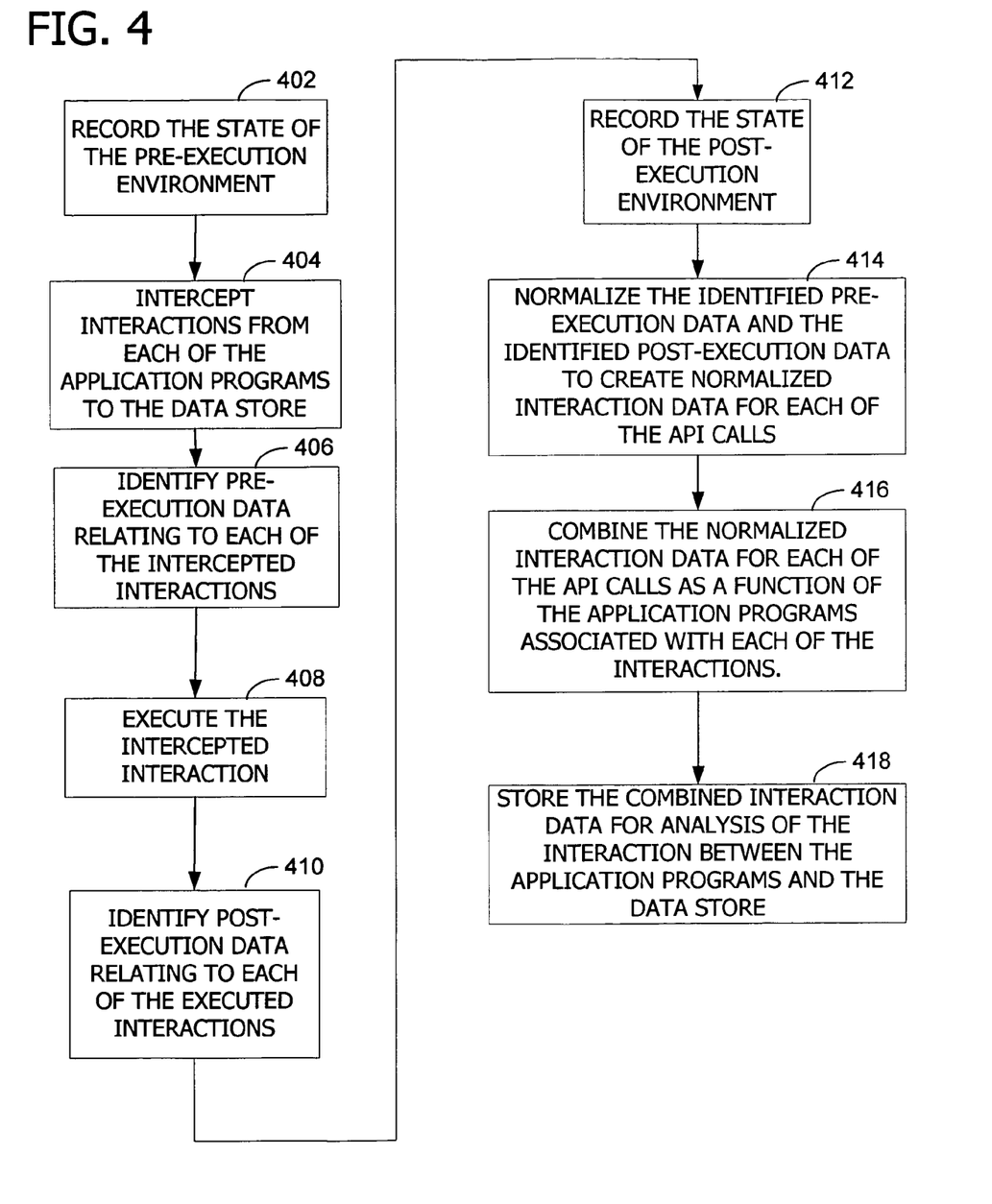
FIG. 4 is a flow chart illustrating a method for monitoring interactions between application programs and a data store.

Referring now to FIG. 4, a flow chart illustrates a method performed by the system 100 for monitoring interactions between application programs and a data store. At 402, a state of the pre-execution environment of each of the application programs is recorded. At 404, interactions from each of the application programs 102 are intercepted and pre-execution data relating to each of the intercepted interactions is identified at 406. At 408, the interactions (such as the API calls) are executed and post-execution data relating to each of the executed interactions is identified. The data relating to the state of the post-execution environment is recorded at 412. The identified pre-execution data and the identified post-execution data from each of the interactions are normalized to create normalized interaction data for each of the interactions at 414. The normalized interaction data for each of the interactions (such as the API calls) is combined as a function of the application programs associated with the interactions (such as the API calls) at 416. At 418, the combined interaction data is stored for analysis of the interaction between the application programs and the data store.

Figure 5:
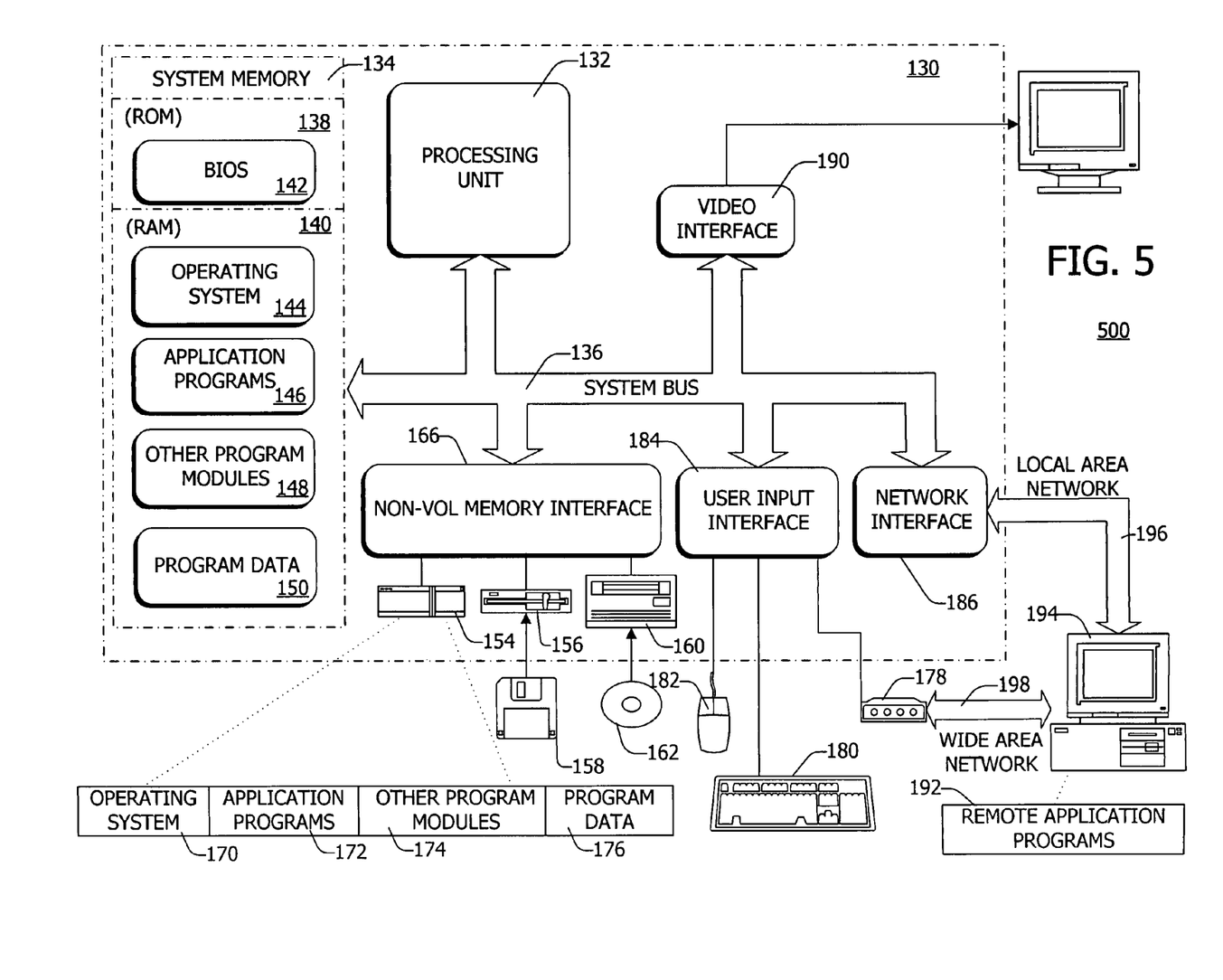
FIG. 5 is a block diagram illustrating one example of a suitable computing system environment in which the invention may be implemented.

FIG. 5 shows one example of a general purpose computing device such as the system 100 in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 or one or more computer-readable media having computer-executable components execute computer-executable instructions such as those illustrated in FIG. 4 to implement the invention.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above methods and systems without departing from the scope of the invention, it is intended that all matter contained in the above description and shown in the accompanying drawings shall be interpreted as illustrative and not in a limiting sense.

What is claimed is:

1. A computerized method for monitoring the interactions of application programs in a computing device with stored data, said computerized method comprising:

intercepting application programming interface (API) calls from a plurality of application programs to a data store, said data store being accessible to the computing device within a housing of the computing device;

in response to the intercepted API calls, identifying pre-execution data relating to each of the intercepted API calls, said identifying including identifying identities of the plurality of application programs, a machine identifier of the machine on which the plurality of application programs are executing, an application program version identifier for each of the plurality of application programs, and an application type identifier for each of the identified pre-execution date for each of the plurality of application programs;

executing the intercepted API calls by routing the API calls to the data store;

in response to completing the execution, identifying post-execution data relating to each of the executed API calls including identifying data resulting from the executed intercepted API calls and identifying machine-specific or system-specific information;

normalizing the identified pre-execution data and the identified post-execution data from each of the API calls to create normalized interaction data for each of the API calls, said normalizing comprising removing the identified machine identifier in the pre-execution data and the identified machine-specific or system-specific information from the post-execution data, said created normalized interaction data including the pre-execution data and the post-execution data rewritten in a generic format;

combining the normalized interaction data for each of the API calls as a function of the application programs associated with each of the API calls; and storing the combined interaction data for analysis of the interactions between the application programs and the data store.

2. The computerized method of claim 1, wherein the identified pre-execution data and the identified post-execution data include a path to an item in the data store, and wherein normalizing the identified pre-execution data and the identified post-execution data comprises normalizing the path to the item in the data store.

3. The computerized method of claim 1, wherein intercepting the API calls from the plurality of application programs to the data store comprises intercepting the API calls from the plurality of application programs to a file system or an operating system configuration data.

4. The computerized method of claim 1, further comprising:

receiving a query from a user; and retrieving a portion of the stored interaction data in response to the received query.

5. The computerized method of claim 1, wherein identifying the post-execution data comprises identifying one or more of the following: an accessed file, an accessed registry key, and a modified registry value.

6. The computerized method of claim 1, wherein each of the application programs has an application identifier associated therewith, wherein identifying the pre-execution data comprises identifying the application identifier associated with the application program initiating the intercepted API call, wherein normalizing the identified pre-execution data and the identified post-execution data comprises replacing the application identifier with a common identifier, and wherein combining the normalized interaction data comprises combining the normalized interaction data as a function of the common identifier.

7. The computerized method of claim 1, farther comprising identifying a state of an execution environment of each of the plurality of application programs before executing the intercepted API calls and further comprising identifying a state of the execution environment of each of the plurality of application programs after executing the intercepted API calls.

8. The computerized method of claim 1, wherein one or more computer storage media have computer-executable instructions for performing the computerized method of claim 1.

9. A system for monitoring process interaction with a memory area storing files and configuration data, said system comprising:

a processor;

a memory area storing a plurality of application programs, file data, configuration data, and aggregated interaction data;

code for intercepting an application programming interface (API) call from one of application programs in the system to the file data or configuration data stored in the memory area;

code for determining interaction data related to the intercepted API call before routing the intercepted API call to the memory area, said code for determining identifies pre-execution data of the API call, said identified pre-execution data including identities of the plurality of application programs, an identifier of the system on which the plurality of application programs are executing, an application program version identifier for each of the plurality of application programs, and an application type identifier for each of the plurality of application programs, said code for determining further identifying post-execution data after routing the API calls to in the memory area, wherein the post-execution data comprises data resulting from execution of the intercepted API call, wherein said processor executes the intercepted API call;

code for normalizing the determined interaction data to create normalized interaction data, said code for normalizing comprising removing machine-specific or system-specific information from the pre-execution data and the post-execution data, said created normalized interaction data including the pre-execution data and the post-execution data rewritten in a generic format; and code for adding the normalized interaction data to the aggregated interaction data as a function of an application identifier associated with said one of the application programs, wherein the aggregated interaction data is indicative of the stability of the plurality of application programs, wherein the processor executes the code for intercepting, the code for determining, code for normalizing and code for adding.

10. The system of claim 9, wherein the code for intercepting comprises an application logging program.

11. The system of claim 9, wherein the code for normalizing comprises computer-executable instructions for removing machine-specific information and user-specific information from the determined interaction data.

12. The system of claim 9, wherein the determined interaction data comprises one or more of the following: a file path, a registry key, a registry value, a machine identifier, an application program version identifier, and an application type identifier.

13. The system of claim 9, further comprising code for querying the aggregated interaction data.

14. One or more computer storage media having computer-executable components for monitoring the memory accesses of application programs in a computing device with stored data for analysis, said computer-executable components comprising:

a tracer component for intercepting memory accesses from a plurality of application programs to a memory area storing files and configuration data, said memory area being accessible to the computing device within a housing of the computing device;

a logger component for identifying pre-execution data relating to each of the memory accesses intercepted by the tracer component, said logger component identifying identities of the plurality of application programs, a machine identifier of the machine on which the plurality of application programs are executing, an application program version identifier for each of the plurality of application programs, and an application type identifier for each of the identified pre-execution date for each of the plurality of application programs, wherein the logger component identifies a state of an execution environment of each of the plurality of application programs before memory access is executed and identifies a state of the execution environment of each of the plurality of application programs after memory access is executed, said tracer component subsequently routs the intercepted memory access to the memory area for execution, in response to a completion of an execution of the intercepted memory access, said logger component identifying post-execution data relating to each of the intercepted memory access and identifying machine-specific or system-specific information;

a normalizer component for normalizing the data identified by the logger component to create normalized interaction data for each of the intercepted memory accesses, said normalizing comprising removing machine-specific or system-specific information from the pre-execution data and the post-execution data, said created normalized interaction data including rewriting the state of the execution environment of each of the plurality of application programs before memory access and the state of the execution environment of each of the plurality of application programs after memory access in a generic format; and an aggregator component for merging, as a function of the application programs initiating the intercepted memory accesses associated with each of the memory accesses, the normalized interaction data created by the normalizing component for analysis of the interaction between the application programs and the memory area.

15. The computer storage media of claim 14, wherein the data identified by the logger component includes a directory path to a file, and wherein the normalizing component replaces the directory path with a generic path.

16. The computer storage media of claim 14, wherein the normalizing component removes one or more of the following from the data identified by the logger component: machine-specific data, domain-specific data, and user-specific data.

17. The computer storage media of claim 14, wherein each of the application programs has an application identifier associated therewith, and wherein the aggregator component merges the normalized interaction data as a function of the application identifier.

18. The computer storage media of claim 15, wherein the logger component identifies data relating to one or more of the following: an accessed file, an accessed registry key, and a modified registry value.

* * * * *

UNITED STATES PATENT AND TRADEMARK OFFICE
CERTIFICATE OF CORRECTION

PATENT NO. : 7,665,098 B2
APPLICATION NO. : 11/117869
DATED : February 16, 2010
INVENTOR(S) : Kavalam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1157 days.

Signed and Sealed this

Seventh Day of December, 2010

David J. Kappos
*Director of the United States Patent and Trademark Office*

UNITED STATES PATENT AND TRADEMARK OFFICE
CERTIFICATE OF CORRECTION

PATENT NO.         : 7,665,098 B2                           Page 1 of 1
APPLICATION NO.    : 11/117869
DATED              : February 16, 2010
INVENTOR(S)        : Jude Jacob Kavalam et al.

It is certified that error appears in the above-identified patent and that said Letters Patent is hereby corrected as shown below:

In column 16, line 1, in Claim 7, delete "farther" and insert -- further --, therefor.

In column 18, line 29, in Claim 18, delete "claim 15," and insert -- claim 14, --, therefor.

Signed and Sealed this
First Day of February, 2011

David J. Kappos
*Director of the United States Patent and Trademark Office*